United States Patent
Mahalingaiah

(10) Patent No.: US 6,587,462 B2
(45) Date of Patent: Jul. 1, 2003

(54) ADDRESS MAPPING MECHANISM ENABLING MULTI-DOMAIN ADDRESSING IN COMMUNICATION NETWORKS

(75) Inventor: Rupaka Mahalingaiah, Austin, TX (US)

(73) Assignee: Dunti Corporation, Austin, TX (US)

( * ) Notice: Subject to any disclaimer, the term of this patent is extended or adjusted under 35 U.S.C. 154(b) by 28 days.

(21) Appl. No.: 09/785,899

(22) Filed: Feb. 16, 2001

(65) Prior Publication Data

US 2002/0114326 A1 Aug. 22, 2002

(51) Int. Cl.$^7$ ............................................. H04L 12/28
(52) U.S. Cl. ...................................... 370/389; 370/389
(58) Field of Search ................................ 370/231, 389, 370/428, 474, 475

(56) References Cited

U.S. PATENT DOCUMENTS

| | | | |
|---|---|---|---|
| 4,538,026 A | | 8/1985 | Yasue |
| 5,095,480 A | | 3/1992 | Fenner |
| 5,134,610 A | * | 7/1992 | Shand et al. ................. 370/400 |
| 5,444,702 A | * | 8/1995 | Burnett et al. ............... 370/254 |
| 5,485,455 A | | 1/1996 | Dobbins et al. |
| 5,524,254 A | * | 6/1996 | Morgan et al. ............. 370/402 |
| 5,596,715 A | | 1/1997 | Klein et al. |
| 5,633,869 A | * | 5/1997 | Burnett et al. ............... 370/396 |
| 5,721,819 A | | 2/1998 | Galles et al. |
| 5,864,683 A | | 1/1999 | Boebert et al. |
| 6,119,171 A | | 9/2000 | Alkhatib |

OTHER PUBLICATIONS

W. Richard Stevens TCP/IP Apr. 2000 Addison–Wesley, 17th, section 3.3–3.5.*

* cited by examiner

Primary Examiner—Ajit Patel
Assistant Examiner—William Schultz
(74) Attorney, Agent, or Firm—Kevin I. Daffer; Conley Rose P.C.

(57) ABSTRACT

An architecture, system and method are provided for transparently mapping addresses across multiple addressing domains and/or protocols. A destination of a packet can therefore be transferred from a first addressing domain within one network to a second addressing domain within another network, without inserting knowledge into the packet of the relationship between the two separate and independent domains. Transmission modules within one network can be identified with unique identification numbers or addresses assigned during configuration of those modules. The identification numbers assigned internal to the network can be mapped and placed upon the packet as the packet enters the network. Mapping, however, is minimal, knowing that relatively few external devices are connected to select internal devices and/or modules. The packet can then be mapped into the network, where it is then transferred across the network whereupon it is mapped to another network or termination device external to the network. The downstream network or termination device may have an addressing domain entirely separate and independent from the addressing domain used within the network, the benefit of which is to free up external addressing space that would normally be used if the external addressing domain were used internally.

7 Claims, 6 Drawing Sheets

ADDRESS MAPPING MECHANISM ENABLING MULTI-DOMAIN ADDRESSING IN COMMUNICATION NETWORKS

BACKGROUND OF THE INVENTION

1. Field of the Invention

This invention relates to a communication system ("network") that transparently maps and operates in one domain of addressing that may be different from the addressing domain interfacing with the network. More specifically, the invention provides mapping between an addressing domain outside the network with an addressing domain inside the network at end nodes of the network, the latter addressing domain not being constrained to a particular bit size and being used to supplant addresses outside the network that, but for this invention, would be used inside the network as well.

2. Description of the Related Art

A communication network is generally regarded as an interconnected set of subnetworks or subnets. The network can extend over localized subnets as an intranet, or can extend globally as an internet between one or more intranets. A communication network can therefore forward data within a localized network between termination devices extending to almost anywhere around the world. The termination devices include any data entry/retrieval system (e.g., telephone or computer), and a network includes a local and/or global interconnection of termination devices configured on one or more subnets.

The basic underpinnings of network operation is the various protocols used to communicate across the network. A popular foundation for those protocols is the Open System Interconnect ("OSI") model of the International Standards Organization. Using that model or a derivative thereof, protocols can be developed which work in concert with each other. A popular communication protocol includes the Transmission Control Protocol ("TCP") and the Internet Protocol ("IP"). TCP/IP are used in networks that are known as packet-switched networks. The advent of asynchronous transfer mode ("ATM") has brought about a divergence from packet-based standards to one using a cell-switched network. Packet-switched and cell-switched networks are in contrast with circuit-switched networks, such as the telephone system. As opposed to maintaining a fixed routing connection for the transmitted message, packet or cell switching evenly allocates or "switches" packet or cell portions of the message across dissimilar routes of the network. The term packet switching henceforth refers generically to switching message portions, regardless of whether that portion is a cell or packet.

In a packet-switched network, each packet of a particular message may be sent across different routes of the network at the same time and then reassembled at the proper termination device. In order to ensure the packets are properly received, certain layers of the OSI protocol stack will wrap the data before the data is sent across the network. For example, TCP can divide data into segments which are then placed into, for example, IP datagrams having a header which includes the IP address of the originating and receiving termination devices. It is not until the IP has been wrapped possibly several times will the TCP be forwarded across the network.

The IP datagram can be further wrapped using a Point-to-Point Protocol ("PPP"), a popular such protocol being that which follows the Ethernet specification at the physical or data transport layer of the OSI model. As the datagram is transferred across the network, the addressing header contains both the source and destination address. The source address and destination address can be represented in different domains. For example, the termination device which transmits the datagram can be considered the source, whereby the source can be represented with possibly numerous source addresses. At the network or internet layer, the source address can be represented as an IP address, whereas at the physical or data transport layer, the source address can also be represented as an Ethernet or Token Ring address. The same applies for the destination address. Depending on whether the source and destination are in an Ethernet network or a Token Ring network, their addresses follow the protocol used by those networks.

The various networks of an internet can be connected in different ways. For example, dedicated telephone lines can transmit data between networks, or a satellite link can be employed. In addition, routers, satellites, fiber-optic cables, and special ISDN telephone lines, or high-speed DSL connections are used to pass information between networks. Regional networks are connected to one another via high-speed backbones, i.e., connections that can send data from one regional network to another. The regional networks can be configured either as Token Ring networks or as an Ethernet server/host (with clients coupled thereto).

Routers are used to direct traffic across the internet and between regional networks. Routers function to open the IP addressed packet and read the IP destination address. Routers can then calculate the best route, and send the packet toward that final destination. The mechanism for determining the best route involves comparing the destination addresses against an internal database called the routing table. Routing tables are generally dynamic in nature and can accommodate multiplicity of nodes and/or forwarding modules of a rather large internet or intranet having IP identification numbers and Ethernet identification numbers (addresses) that can change as the modules are reconfigured with new routers, bridges, switches, and/or gateways. In this manner, conventional networks purposely rely upon the internal modules or nodes having a non-structured identification numbers or addresses. In this manner, the multiple subnetworks which form the internet can be updated and varied with new modules and corresponding addresses not knowing necessarily the addresses of the other modules or nodes. All that is required is that the routing tables within the routers be updated or periodically programmed. However, one router on the network will not necessarily know the location of the physically closest router or its placement within the network. The router will simply route based on its existing routing table and the resulting look-up outcome. Such a system can be considered a non-relative or non-deterministic router topography. Non deterministic routers tend to rely on the number of hops (i.e., the number of routers or gateways) when determining the optimal routing path. Thus, while a router may know the number of additional routers on a given path, it does not necessarily know or have a link to the identity and relative placement of those routers.

As a precept to the routing function of a router, each node of a regional network and the multiplicity of nodes across numerous regional networks, have a common identifier. That is, each node across an intranet or internet between a source termination device and a destination termination device has an identification number to allow a router to route data across a plurality of nodes and eventually to a destination node, or termination device. While the identifier can dynamically change, it is important that the identifiers be unique to their corresponding nodes so that addressing can be specific from one node to another throughout the routing process. Regardless of whether the nodes and termination devices use high speed Ethernet, or even higher speed, for example, Synchronous Optical Networks ("SONETs"), a singular (or common) addressing domain is needed across all nodes of an interlinked set of regional networks which form an intranet or internet.

Using a common addressing domain for each and every node of an internet or intranet having possibly numerous subnets, poses several problems. For instance, a 32-bit address domain is well-known and typically used in IP networking. To access the Internet spread across the global environment of termination devices, every access point (or interface) needs to have a unique IP address in the same 32-bit domain. 32-bit addressing provides for four gigabit IP addresses. However, four-gigabit addressing may soon be insufficient in the ever growing world of internet use. Since this is becoming a limiting factor, a 128-bit addressing domain with IPv6 is being introduced. However, this is again another domain and all addresses within the overall network need to reside in this domain for connectivity. In addition to the addressing limits for IP networking, there are also addressing limits at lower model layers.

IP is a network layer addressing mechanism. Underneath this is the data link layer (or transport layer or MAC layer) addressing domain, most popular of which is the Ethernet. Ethernet is a 48-bit addressing domain, and each Ethernet device needs to have a unique address within this domain. Since Ethernet is a data link layer addressing mechanism, today's routing techniques update this address at every hop requiring all devices within the network to have unique addresses in the same or "common" data link addressing domain.

As the network increases in size, it would be desirable not to merely increase the size of the addressing domain. In other words, simply adding bits to the addressing domain of an Ethernet data link layer can increase the decoding and, therefore, the routing operation across the network. Additionally, while each termination device may have one or more IP addresses which can forward data into that device or receive data from the device, each device regardless of its location in the overall network must have its own unique Ethernet address if the data link layer uses Ethernet technology. While 48-bit addressing in the Ethernet addressing field is quite large, the advent of high speed Ethernet makes it likely that more that 48-bit addressing may be needed. In other words, the number of users that use an Ethernet card on their computer, router, gateway, etc. may quickly extend beyond $2^{48}$. In addition, each time a network administrator wishes to use Ethernet in his or her operation, that administrator must purchase a portion of the $2^{48}$ Ethernet addresses. Acquiring Ethernet bandwidth can be quite expensive, especially in large organizations that use Ethernet.

It would be beneficial to enable transmission across multiple address domains that are transparent to higher layers, such as the IP network layer. This will overcome the problem of running out of address space or having to introduce even larger addressing bus size. It is critical, however, that any such mechanism be transparent to the higher levels or the user software levels.

The mapping of a domain of addresses should ideally be transparent to the division of a global network into possibly numerous local networks. An improvement would exist if somehow the local networks (or "networks") could have different addressing domains. A network being serviced could beneficially have an addressing domain and/or protocol that is separate and independent from an addressing domain of a network providing the service. This would enable efficient organization and management of data transmission within the domain providing the service without impacting the address domain that is being serviced. Any modifications and scaling within the network providing services will then be ideally isolated from the network being serviced. Similarly, any changes or scaling to the network being serviced will be transparent to the servicing network. The aforementioned concepts, albeit not available in conventional addressing or address mapping would, if employed, significantly enhance such conventional systems.

It would be of further benefit to introduce within nodes of the servicing network that are not accessible outside that network, an addressing domain that is separate and distinct from the addressing domains of nodes that connect to nodes external to the network, and separate and distinct from nodes fully external to the network. In other words, a distinction is made between intermediate nodes and end nodes internal to the network. The end nodes communicate with termination devices external to the network, whereas the intermediate nodes communicate solely between end nodes or between one another. It would be a beneficial improvement over conventional node architecture for the intermediate nodes to have an addressing domain that would not consume any addressing of the end nodes or termination devices external to the network. In this fashion, identification numbers of the intermediate nodes would not consume addressing bandwidth of the data/physical layer, or higher layers, of the OSI model. Importantly, the improvement would eliminate the need to expand IP and/or Ethernet addressing domains, and therefore eliminate the relative cost involved in such.

The addressing domain or identification numbers of addresses assigned to nodes within the improved network architecture should advantageously be quite large, possibly extending beyond 48-bits or 64-bits. Alternatively, the addresses assigned to such nodes can be quite small. Thus, the addressing of the nodes within the improved network can be scaled either large or small according to advantages beyond that of conventional addressing. These benefits as well as others are further described herein below.

SUMMARY OF THE INVENTION

The problems outlined above are in large part solved by an addressing mechanism that allows transparent communication between multiple addressing domains. For example, a servicing network may have an addressing domain separate from a network being serviced. The servicing network can hereinafter be regarded as the "network" or "networks" while the serviced network is external to the servicing network. Contained within the servicing network are intermediate nodes placed between end nodes. The nodes are hereinafter referred to as "modules." The modules perform routing functions based on source and destination addresses of the packet being forwarded. It is, therefore, contemplated that the communication system hereof includes one or more networks interconnected with one another between termination devices. A termination device may be the source of data, and another termination device may be the destination for that data. The termination devices can be computers, routers, gateways, switches, bridges, or any hardware of software module which can transfer, map, read data into the network, or write data from the network. Reading and writing functions can be those normally associated with any media usable by a hardware or software element, and the media can be either permanent or temporary.

Within the network is at least one module, and preferably numerous modules interconnected to each other. The modules can be classified as end modules (exit and entry end modules) or as intermediate modules. The end modules are those that are coupled to other networks, addressing domains, or termination devices outside of the network. The entry end module performs protocol wrapping functions as packets of data enter the network, whereas exit end modules strip protocol used by the network as the packets exit the network. The end modules can, if called upon, also perform a routing function similar to intermediate modules. Each module can be configured in hardware to be substantially the same, with only the programmed functions being different based on where, within the network, the modules are placed.

Each module may include a minimum of one bi-directional port and a traffic manager which controls the port or ports. The number of ports is scalable in that there may be one or more input ports and one or more output ports arranged in various configurations, with the traffic manager deciding which packet received on an input port will be forwarded to which of the various output ports. The traffic manager includes a decoder and various buffers. The decoder performs a comparison between a destination address wrapped on datagrams by the entry end module and the identification number of that module based on the position of that module within the overall network.

Advantageously, identification addresses for each of the intermediate modules and end modules of a given network can utilize its own unique and independent identification layer. The identification layer of a particular network is unique in that it can be different from addresses within another network. While the networks can be connected to one another by end modules, addressing within one network is totally separate from addressing in another. For example, addressing in a first network using its own identification layer can have addresses 1, 2, 3, 4, 5 ... N, representing each of N modules within that network. However, a second network can have the same addressing identifiers 1, 2, 3, 4, 5 ... N as well as other addressing identifiers such as N+1, N+2, N+3 ... M. However, since addressing in one network is separate from addressing in another, the first and second networks need not have a common addressing mechanism, where each module of both the first and second networks require a unique identification number. Instead, a module of the first network can have an identifier of 1, and a module in the second network can also have an identifier of 1. In this fashion, addressing can be reused among networks. Importantly, the numerous intermediate modules of one network may be duplicative as to addressing numbers within another network. This substantially reduces the constraints on common addressing numbers which are relegated only at the periphery or interconnection end modules and termination devices.

The end modules and termination devices must have a common addressing scheme, where each end module and termination device has its own unique identifier at the data link/physical layer. Thus, while the end modules and termination devices connected to the end modules have unique and corresponding lower layer addresses such as Ethernet addresses, the intermediate modules within one or more networks can have an independent set of identifiers separate from those of the end modules and termination devices. By assigning unique identifiers only at the periphery of networks and not internal to each network, the Ethernet addresses at the peripheries and termination devices can be minimized so that Ethernet addresses are not needlessly consumed.

In order to transfer a packet of data from a termination device to another termination device, separated by a network with an addressing domain internal to the network different from addressing domains external to the network, a simple mapping function is all that is required. In other words, the termination device which sources the data may have a unique Ethernet address domain noted on the packet being sent. Moreover, the destination termination device has its own unique addressing domain shared with that of the source termination device. As such, the source and destination devices are said to have a common addressing domain, where each device has its own unique identifying number. In addition to the termination devices having a unique identifying number of a first addressing domain, the entry and exit end modules also have a unique identifying number within the first addressing domain. In this fashion, the source termination device will have an identifying number separate and distinct from the identifying number of the entry end module. In addition, the exit end module will have an identifying number unique to the exit end module within the same addressing domain as the entry end module, the source termination device and the destination termination device. In this fashion, a single addressing domain can be used to forward data from the source termination device to a unique entry end module and eventually to an exit end module coupled to the destination termination device. What happens within the network, and among intermediate modules, is entirely separate and independent of addressing between termination devices and end modules. In other words, the intermediate modules can have an addressing scheme altogether different from the addressing scheme used to send data into an entry end module and receive data from an exit end module. The routing between termination devices and end modules is, therefore, said to be independent of the routing between intermediate modules. Independent routing is often referred to interchangeably as independent addressing. By freeing addresses used in Ethernet from the intermediate modules, it will require considerably less number of Ethernet addresses only on the periphery (end module) and termination device connected thereto. Therefore, an extremely large network can be easily accommodated within the existing 48-bit Ethernet address range or the 32/64-bit IP address range.

Assigning identification numbers to intermediate modules and addressing those intermediate modules within an addressing domain separate and distinct from modules used outside the network, e.g., IP addressing, Token Ring addressing, or Ethernet addressing domains, represents a substantial advantage in addressing bandwidth. Lessening the number of Ethernet addresses or other public domain address usage within the network is a primary importance. This allows communication between independent address domains thus removing their restrictions of a domain address range limit.

The present network with internal addressing separate and distinct from addressing and/or protocols at the end nodes and external to the network is compatible with the OSI model. For example, the entry end module can wrap the datagram with IP source and destination addresses, and Ethernet source and destination addresses unique to the network. The separate addressing protocols unique to the internal modules are also added at the entry end module, such that the wrap includes wrapping not only the IP source and destination address, the Ethernet source and destination address, but also the internal source and destination addresses of the network. The internal addresses through the network are added when the data packet enters the network and are stripped or removed when the data packet leaves the network. The IP addresses as well as the Ethernet addresses, however, remain. As such, the internal addressing domain denotes the source and destinations of the entry end module and the exit end module, respectively, of the network, while the IP and Ethernet addresses denote the source and destinations outside of the network. In this manner, the datagram can be forwarded through the network in a seamless fashion without involving any changes to the protocols used by the conventional OSI model.

Conventional Address Resolution Protocols ("ARP") can be used to determine the location and, therefore, address of an external module relative to an exit end module. ARP can be broadcast over the network to identify, for example, the destination Ethernet address of the module external to and downstream of the exit end module, based on knowing that module's IP address. ARP broadcast can also be used to determine the structured destination address of the exit end module immediately upstream of the external module having the destination IP address. As such, ARP can determine from the destination IP address, not only the destination Ethernet address, but also the destination address of the immediately upstream exit end module. This proves useful when targeting the exit end module as a destination module within the network. Knowing the relationship between the exit end module and the eventual targeted, external module, as well as the entry end module and the external module connected thereto, allows the present network to seamlessly interface with external serviced networks, transparent to the user. ARP is, therefore, used not only to determine (i.e., resolve) the relationship between modules internal and external to the network, but also is used to resolve communication between two differing addressing domains (i.e., an internal structured domain and an external, non-structured domain).

According to one embodiment, a communication network is provided. The communication network comprises a plurality of interconnected modules adapted to direct packets of data through the network. Each module can be identified according to identification numbers contained within a first addressing domain of a first model layer. The first model layer and the first addressing domain is independent and separate from the addressing domain of a second model layer used to identify modules which forward and receive the packets of data outside the network. In particular, the first addressing domain is used to forward data between the entry and exit end modules, whereas the second addressing domain is used to forward data between the end modules and the respective source and termination devices external to the network.

The first addressing domain can be a structured addressing domain, if desired. While it is not necessary that the first addressing domain for forwarding data within the network be structured or hierarchical in nature, if the first addressing domain is indeed structured, the identification numbers within the first addressing domain can be bifurcated into several groupings of bits, where each group represents a certain structure such as a specific hierarchical structure. A decoder within the first module is adapted to compare an address of the packets of data within the first grouping of bits if the address originates from a module within a hierarchical level dissimilar from the first hierarchical level.

According to another embodiment, the communication network can include a pair of end modules. The pair of end modules, known as entry end modules and exit end modules operate as bookends between intermediate modules. The first addressing domain is used to identify each of the end modules and the intermediate modules according to unique identification number assigned to such modules. The second addressing domain is used to identify each of the end modules and all modules external to the network with unique identification numbers. The identification numbers of modules within the first addressing domain can overlap with identification numbers of modules within the second addressing domain. However, since the first and second addressing domains are separate and independent from one another, there is no chance that addressing between modules of the first addressing domain can be improperly routed to modules within the second addressing domain. A mapping occurs between an identification number of an end module represented within the first addressing domain to a corresponding identification number within a second addressing domain and vice-versa as data is transferred into and out of the end modules. By using dissimilar addressing domains, and converting or mapping identification numbers in the two domains at the end modules, a substantial amount of public domain identification numbers of the external second addressing domain are not needed internal to the network.

According to yet another embodiment, a method is provided for sending a packet of data across a communication network having intermediate modules interposed between an entry end module and an exit end module. The method includes wrapping the packet of data at the entry end module with a source address of the entry end module and a destination address of the exit end module. The wrapped packet is then forwarded through the intermediate module to the exit end module by decoding a first grouping of bits within the destination address before decoding a second grouping of bits within the destination address. After the modules are forwarded through the communication network, the source and destination addresses are removed (i.e., only the source and destination addresses that are structured and are added by the entry end module are removed). Other addressing protocol contained upon the packet of data prior to entry into the communication network is maintained, and thus not removed by the exit end module. The other addressing protocol may correspond to any addressing domain, such as, for example, an IP addressing or Ethernet addressing protocol. While maintaining the IP or Ethernet addressing protocols upon the wrapped packet, the packet can then be forwarded from the exit end module to a termination device identified as a destination address of either the IP address or the Ethernet address. The maintained addressing protocol can be referred to as an upper layer addressing protocol as set forth in the OSI model, that layer being a layer placed upon the packet prior to placing the structured addressing reserved exclusively for addressing within the network.

BRIEF DESCRIPTION OF THE DRAWINGS

Other objects and advantages of the invention will become apparent upon reading the following detailed description and upon reference to the accompanying drawings in which.

Figure 1:
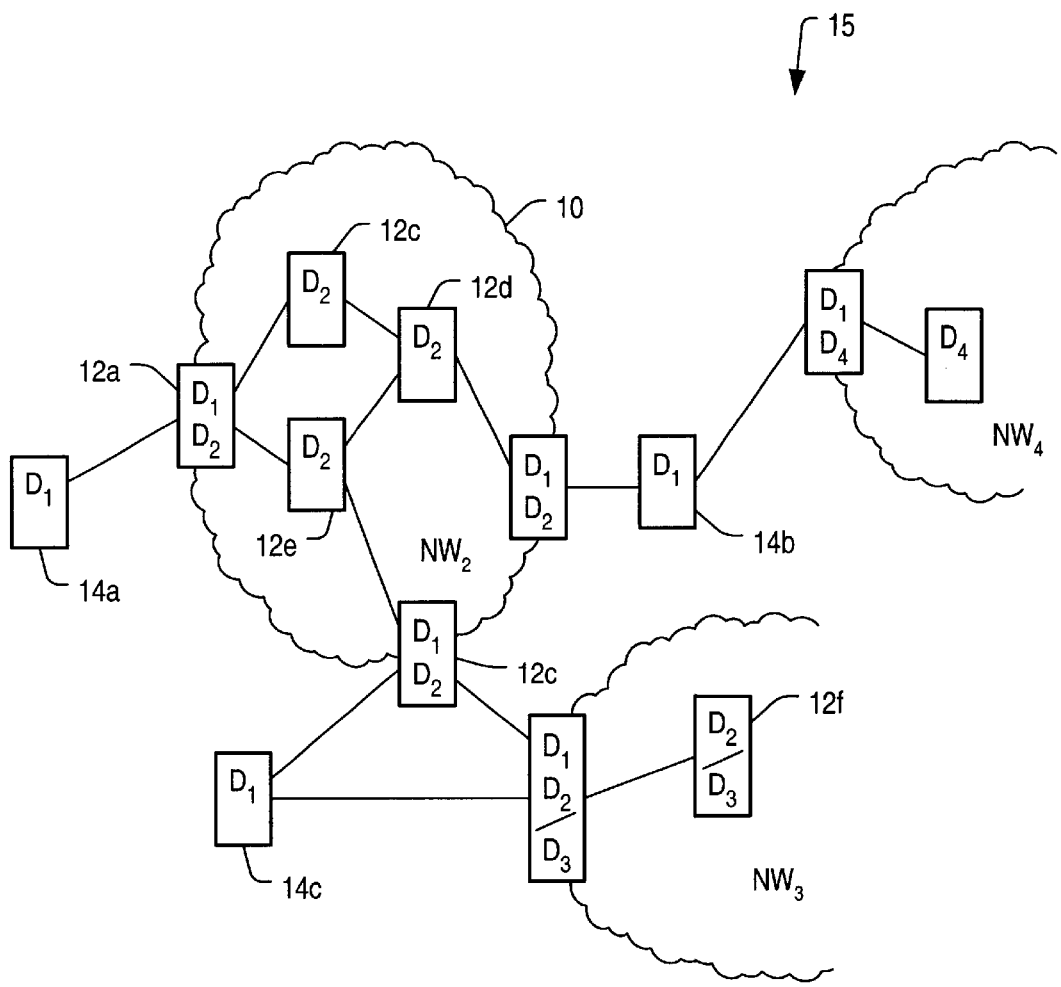
FIG. 1 is a diagram of a set of modules arranged within several networks or subnetworks coupled together to form an interconnected set of networks having addressing domains within one or more networks that is independent of addressing domains external to the network.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a communication network 10. Network 10 includes an interconnection of subnets linked by nodes, or modules, 12. Network 10 can be thought of as one or more intranets interconnected with one another, or interconnected via an internet.

Each node or module 12 may embody a subnet or a plurality of interconnected subnets. Select modules 12a and 12b can be used to receive input data into network 10, or transmit output data from network 10. Contained within network 10 can be intermediate modules 12c, 12d, and 12e. Intermediate modules 12c–12e are used solely to transfer data within the network, but do not operate as an end node for transmitting data external to the network. Network 10 may be one of possibly numerous networks interconnected with one another to form an internet 15. Thus, an internet is one which forwards data between termination devices 14. The termination devices can operate as bookends between one or more networks 10. Shown in FIG. 1 are termination devices 14a and 14b which transmit information across network 10. End modules 12a, 12b, and/or 12c can be connected to end modules of another network, or to termination devices 14. In the embodiment shown in FIG. 1, three networks are interconnected with one another, and labeled as network 2 ($NW_2$), network 3 ($NW_3$), and network 4 ($NW_4$). For purposes of further illustration, network 10 is used to illustrate mapping between addressing domains internal and external to network 10 as set forth below.

It is recognized that a subnet or node can include either a backbone or ring topography, depending on the desired application. The various nodes can be classified as a single node or multi-nodes. A node is denoted as any device operable in hardware and/or software to direct the flow of data in a packet switching environment across one or more interconnected networks. Thus, the term "node" or "module" can be thought of as simply a hardware and/or software module, functioning as a computer, phone, router, switch, bridge, gateway, etc. In essence, the termination device is a module in that information can be sent into the termination device, and data received from the termination device; the difference being, however, that a termination device exists entirely outside the network, whereas a module is a hardware and/or software module that resides within the network, either as an end module or as an intermediate module.

Each module within internet 15 includes an identifying number for use in addressing that module. Conventional internets use publicly available identification numbers uniquely assigned to each and every module and termination device across the entire internet. Thus, in the example shown, ten modules and three termination devices each have their own Ethernet identification number if communication via the datalink occurs over an Ethernet. In large scale internets, the number of Ethernet identification numbers can be rapidly consumed and, therefore, it would be desirable that the intermediate modules of one or more of the networks be placed on a separate and distinct addressing domain. In the example shown, network 10 end modules and intermediate modules have identification numbers within a first addressing domain ($D_2$) that is separate and distinct from the identification numbers of the termination devices 14 and the end modules 12a–c. The identification numbers of the end modules and termination devices are addressable from a second addressing domain ($D_1$). In this fashion, the addressing numbers 1, 2, and 3 which could represent the intermediate modules can be reused as addressing numbers 1, 2, 3, etc. of the end modules 12a, 12b and 12c, and termination devices 14a and 14b.

The ability to reuse identification numbers serve two purposes. First, dedicating intermediate modules with a separate addressing domain avoids having to use publicly available IP and Ethernet addresses for internal-network routing. Second, the number of intermediate modules and the number of networks interconnected between termination devices and exit end modules of one or more networks affords scalability within the first and second addressing domains. In the latter instance, it may be desirable to implement the intermediate modules of two networks within the first addressing domain $D_2$, with the number of publicly available identification numbers correspondingly reduced on either ends of the multiple networks. In this fashion, network 3 ($NW_3$) can be included with network 2 ($NW_2$) if fewer publicly available addresses are used. Or, alternatively, the intermediate modules of $NW_3$ can have an addressing domain separate and distinct from those of the intermediate modules of $NW_2$. Intermediate module 12f is indicative of the amount of scalability needed: whether its addressing domain is shared with addressing domain $D_2$ of network 10 or is separate and distinct from addressing domain $D_2$, as noted by domain $D_3$.

Figure 2:
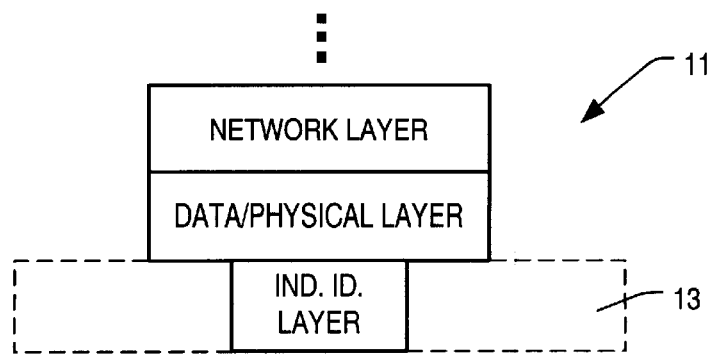
FIG. 2 is a model layer diagram showing the lower OSI layer (data/physical layer) with an independent addressing domain layer beneath the lower layer for addressing internal to networks.

FIG. 2 illustrates the scalability of the addressing domains. In particular, the addressing domain of the independent identification layer of the intermediate modules can be small or large (i.e., have a relatively few number of bits or a relatively large number of bits). If the addressing domain $D_2$ is limited only to one network 10, then the field of bits is relatively small. However, as indicated by the dashed lines, the field of bits can be expanded depending on the size of the network 10, or whether additional networks, such as $NW_3$ and $NW_4$ are included with $NW_2$ to encompass unique identification numbers for all three networks, rather than just one. If all three networks in the example shown in FIG. 1 are to have unique identification numbers for the corresponding intermediate modules, then the number of bits representative of those unique identifiers can be quite large if the overall internet is large. It is recognized that in the OSI model 11, shown in FIG. 2, multiple model layers represent the transfer of data across an internet. The two lowest layers of the OSI model 11 are indicated as the network layer and data/physical layer. However, according to an improvement hereof, an even lower layer addressing domain can be used, denoted as the independent identification layer 13. The independent identification layer 13 is the field of bits representing unique identification numbers of intermediate modules within one or more networks. When a packet of data enters a network from a termination device external to the network, the IP address within the network layer and the lower level data/physical layer (Ethernet address) is further wrapped with the independent identification layer source address and corresponding destination addresses unique to that addressing domain. As such, the wrapped information discloses not only where the data came from external to the network, but also due to the wrapped independent identification layer, tells where within the network the data enters the network and where within the network the data exits the network.

An end node, which encompasses possibly an end module, is located at the periphery of a given network to receive or transmit data into or from, respectively, the network. An end module can be thought of as either an entry module or an exit module, depending on whether it receives packets coming from an external source or transmits packets to an external target. It should be noted that an end module could act as an intermediate module for packets passing through that node. An intermediate module simply passes the packets from one module to another module. The modules can be configured as end modules or intermediate modules depending on how they are programmed. An entry module is programmed to wrap the incoming packets, an intermediate module may modify and/or simply forward the wrapped packets, and an end module strips the wrapped information. Specificity of each module is imparted during configuration dependent on each module's position within the overall network, and also dependent on how that module is being used on a particular data flow path. For example, an intermediate module may be an end module depending on whether it simply passes through data or receives data external to the network. It is understood that the modules access physical media and configuration occurs within registers of each module. A decoder which operates similar to a Media Access Controller ("MAC") discerns the incoming packets based on the destination MAC address using various types of physical media protocol, such as Ethernet, Token Ring, FDDI, or ATM.

Figure 3:
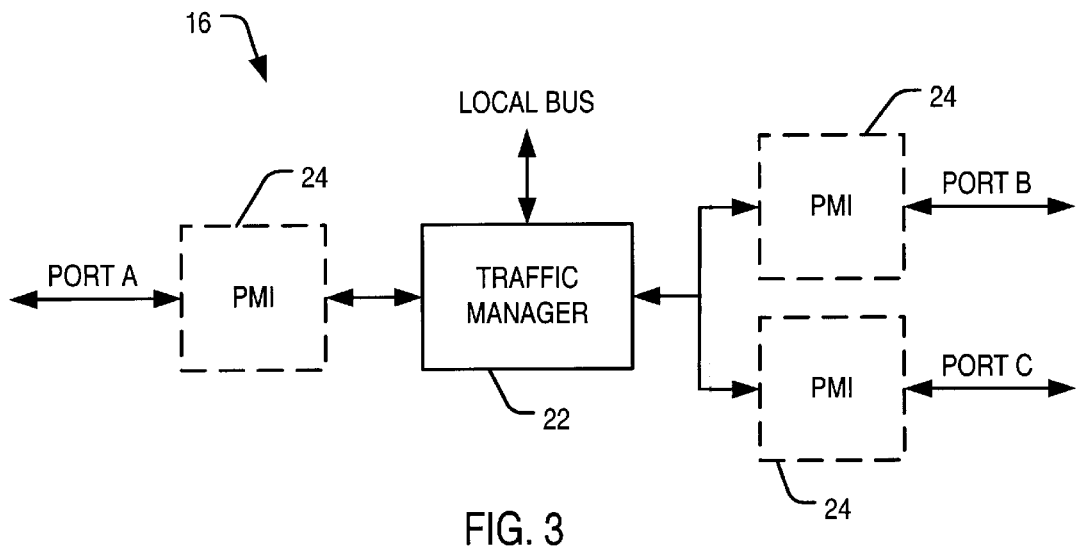
FIG. 3 is a block diagram of a module shown in FIG. 1, wherein the module can be employed either as an intermediate module, end module, or both.

Incoming packets can be received over any type of media, including wired media or wireless media. FIG. 3 illustrates a traffic manager 22 which serves numerous functions, one of which is to optimally route packets of data between input and output ports. The number of input and output ports can vary and the interconnection between certain input ports and certain output ports can also vary depending on the configuration of modules. Modules 16 can suffice as end modules or intermediate modules, such as those shown in FIG. 1 as numeral 12. Modules 16 can be called upon to interface with a different physical media than the loop protocol by using a Physical Media Interface ("PMI") 24. PMI 24 performs many functions, one of which includes the MAC function of moving the data over physical hardware conductors based on the physical address of each network interface within the computer itself, and another of which is to synchronize the packets of data being sent or received. If modules 16 are not used to convert between OSI layers, then the wrapped packet (e.g., physical media packet wrapped with higher domain protocols) may be directly sent through modules 16 to the appropriate port.

It is desired that each traffic manager 22 within each module 16 be configured during assembly of the network. Each traffic manager can include programmable logic and, more importantly, non-volatile memory. When programmed, traffic manager 22 will maintain its programmed status unless it is reconfigured. The traffic managers are, therefore, configurable using known "firmware" program techniques. Such techniques include programmable read-only memory ("PROM"), programmable registers of nonvolatile memory, fuses, anti-fuses, etc.

Reconfiguration of traffic managers can take place if, for example, traffic congestion is discovered in a select region of the network. Alternatively, reconfiguration can occur when the network is changed or expanded. Still further, reconfiguration might occur when a section (e.g., subnet) of the network is taken down or deactivated for various reasons. In these instances, one or more traffic managers can be reconfigured in the field or, alternatively, those traffic managers can be selectively reconfigured using signals sent over the local bus using a broadcast technique.

Figure 4:
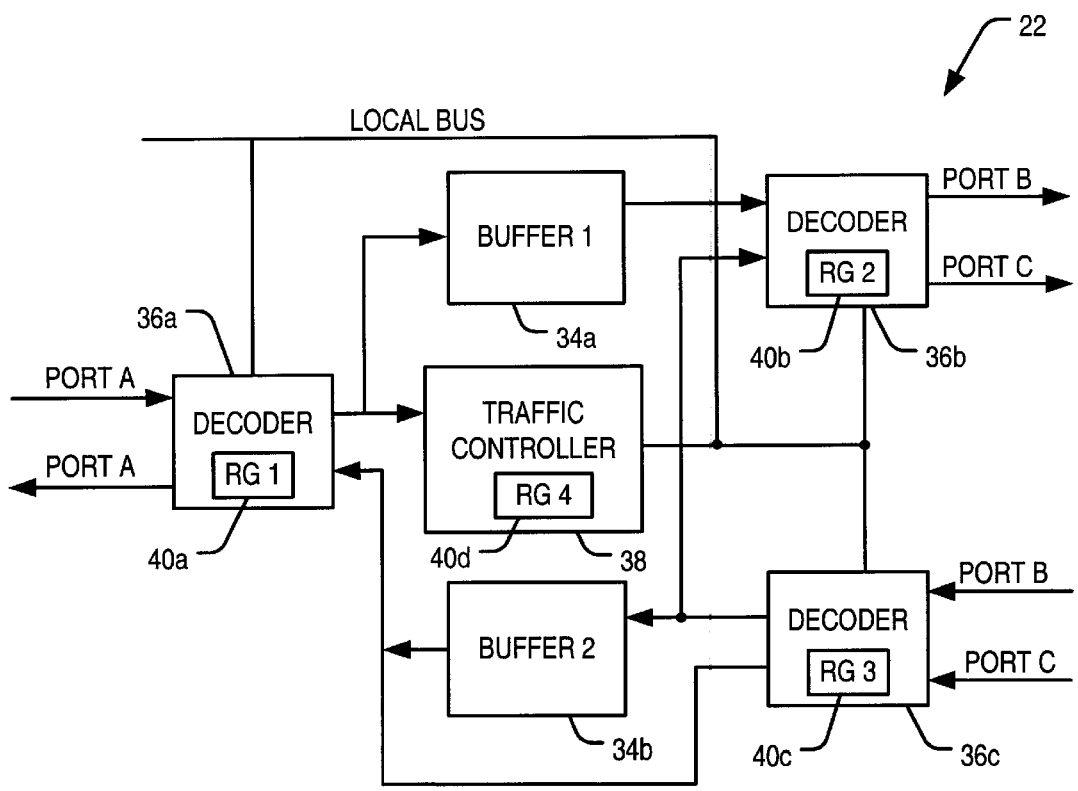
FIG. 4 is a block diagram of a traffic manager of FIG. 3, comprising a traffic controller linked to buffers and decoders placed within the data transmission path of the network.

FIG. 4 illustrates traffic manager 22 shown in more detail. Traffic manager 22 functions to direct incoming data to an appropriate output port. It determines the output port for an incoming data packet based on a simple algorithm. The traffic manager is aware of its position relative to the network and its neighboring traffic managers or nodes. Based on this knowledge, the traffic manager determines the appropriate output port in accordance with the predetermined algorithm. The traffic manager 22 also interfaces between ports of different media, speed, and direction. After the output port assignment is made, the traffic manager can (i) store the data in a local buffer if the incoming data is slower than the speed of the directed-to output port until there is sufficient time to sustain the speed of the output port, (ii) forward the data without an intervening storage if the output port is free or if the incoming data is at the same speed as the output port, or (iii) transfer the data through a FIFO-type storage device when the incoming data is coming at a faster rate than the speed of the output port. The traffic manager also manages resource allocation, such as allocation of various output ports and buffers, and the algorithms make decisions regarding allocation to reduce the latency through the traffic manager.

Traffic manager 22 includes one or more buffers as well as one or more decoders. In the example shown, the buffer is distributed as two buffers 34a and 34b, and the decoder is distributed as three decoders 36a, 36b, and 36c. Distribution of the buffers and decoders depends in part on the configuration of the ports. In the example shown in FIG. 4, a three-port configuration is shown. However, more than three ports and possibly only two ports can be used, wherein the number and distribution of decoders and buffers would correspondingly change.

Each port is shown as a bi-directional port and thereby accommodates full-duplex dialogs. The physical media of port A may be different from that of port B or port C, especially if traffic manager 22 is configured within an end module or an intermediate module. For example, decoder 36a serves to decode addresses within an incoming packet sent into port A, to ensure traffic manager 22 is to receive the packet. Traffic controller 38 can be used to decide whether the packet should be forwarded to output port B or output port C. In many instances, the packet can be forwarded directly from port A to port B (or port C), or is forwarded through buffer 34a. Similar to port A, packets sent to ports B and C can be forwarded to port A, port B, or port C via decoder 36c. Traffic controller 38 includes control signals and address lines extending to each of the buffers and decoders for effectuating optimal routing based on the availability of the destination ports. Coupled in parallel across buffer 34b may be a series of conductors over which packets can be sent instead of sending those packets through buffer 34b. Thus, incoming packets on port B or port C can be forwarded directly to port A, to port A through buffer 34b, or directly to port B (or port C) as shown in the example of FIG. 4.

Within decoders 36 and traffic controllers 38 are configuration registers. Configuration registers may be configured from an In-System Programming ("ISP") tool used for configuring a Programmable Logic Device ("PLD") or a Programmable Gate Array ("PGA"). The configuration registers and therefore the traffic controllers and buffers can be thought of as a PLD or a PGA. Alternatively, the configuration registers can be programmed from non-volatile memory possibly associated with traffic manager 22, or from the control processor via the local bus. The configuration registers 40 receive configuration information preferably during initiation of power to traffic manager 22. Alternatively, registers 40 may be programmed as an SRAM. Still further, registers 40 may include a PROM or ROM permanently programmed by the network installer. Contained within each register are bits used to enable certain ports in order to fix the forwarding of packets from one port to another. Alternatively, each register may be configured to select various ports and paths based on dynamic traffic conditions.

Within register 40a are bits that can be programmed to enable transfer of all packets from port A to port B, for example. Other bits may be programmed within the various registers to include an identification number attributed to that particular traffic manager of module. Each module within the network has a corresponding unique identification number stored in a corresponding configuration register. The identification number signifies the relative location of the node with respect to other nodes in the network hierarchy. The identification numbers of all modules within the network containing bits are bifurcated into fields and, as described herein below, each field corresponds to a particular hierarchical level. A decoder which receives incoming packets can be configured by the corresponding register to only decode a field of bits to which the particular module has been attributed. In other words, if module 22 belongs to level three, then decoder 36a decodes the destination address of the incoming packet sent across port A within field three of the multi-field address. This ensures a fast decode operation and significantly enhances the throughput of data. If the decode yields a comparison, then decoder 36a will forward the packet to the appropriate decoder 36b or 36c depending on which port is configured as the output port established within register 40. Alternatively, a decoder may be configured to decode all fields above it in hierarchical level, or one field above it, to determine if the packet belongs to the current level. Further details regarding differing functions, configurations, and operations of traffic manager 22 will be provided below when discussing whether the traffic manager within a particular module operates as an end module or an intermediate module. The buffers 34 can be distributed as shown in FIG. 4, or can be a centralized buffer, depending on the configuration of the input and output ports. Regardless of its configuration, the buffer operates as a temporary memory space and, preferably, a contiguous memory space, such as that found in semiconductor memory. A popular form of semiconductor memory includes single or multi-port RAM or DRAM (e.g., ZBT RAM or SDRAM).

Figure 5:
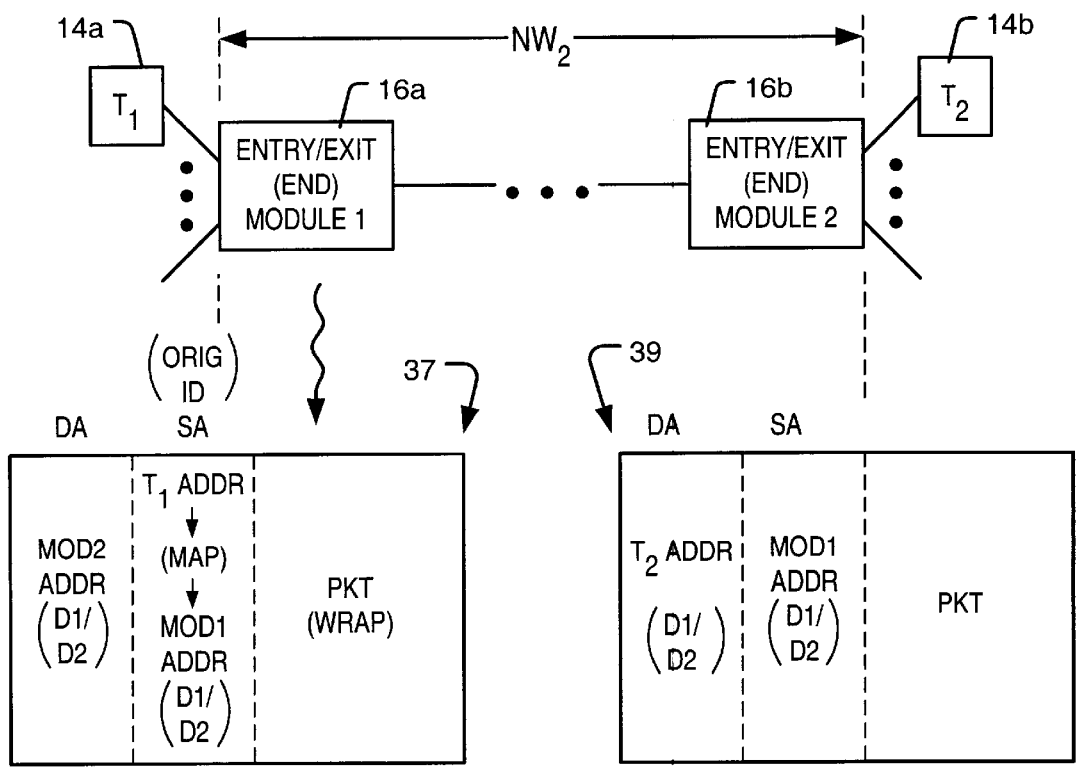
FIG. 5 is a block diagram of end modules placed on opposing ends (i.e., periphery) of a network having a first addressing domain, where each end module is shown linked to at least one termination device addressable within a second addressing domain.

FIG. 5 illustrates routing of the packet through a transmission network. The network can suffice as that shown in FIG. 1 as item 10. Before routing can occur, however, identification of a routing path to and from termination devices must be established. Coupled to termination devices 14a and 14b are end modules 16a and 16b. If device 14a is the originator of a packet, then end module 16a can be considered an "entry" end module, or simply entry module. If the incoming packet includes a destination address to termination device 14b, then device 14b is considered the targeted or destination termination device, and end module 16b is considered an exit module.

An address resolution mechanism is used to identifying the relationship between termination devices and end modules (particularly when there are multiple termination devices per end module), and how the incoming packet is routed from the originating termination device 14a to the destination termination device 14b. An Address Resolution Protocol ("ARP") is broadcast from termination device 14a. The destination address of a broadcast ARP is sent to each and every node within the network, and continues on until all nodes have received the resolution protocol. Contained within the resolution protocol may be an address of destination termination device 14b. If so, device 14b replies back across the network and eventually to the originating termination device 14a. Based on the broadcast of addresses and ensuing replies, the positions of termination devices relative to end modules can be determined based on the address of those destination and origination devices. Accordingly, the address and location destination device 14b is determined relative to end module 16b. It is from the resolved location that a packet can be quickly transferred between the network end modules and locations (i.e., termination devices or other networks) external to the transmission network. Further details of ARP are shown in an example set forth herein below.

Transfer of a wrapped packet from an originating termination device 14a to a destination termination device 14b entails numerous mechanisms. Reference numeral 37 illustrates a wrapped packet ensuing from entry module 16a. The wrapped packet includes a source address (SA) of an originating termination device having a unique identification number, and also includes a destination address (DA) of the exit module (MOD2 ADDR) 16b. The source address is therefore the address of termination device 14a which gets translated (or mapped) to an address of entry module 16a. The source address of termination 14a is mapped to an address of entry module 16a by noting the relationship between the addressing domain external to $NW_2$. That addressing domain may be, for example, an Ethernet addressing domain of the second addressing domain $D_1$. However, it is important to change, modify, or map the addressing domain of the module 16a of the Ethernet address to an addressing domain unique and internal to $NW_2$, that addressing domain being the first addressing domain $D_2$. Mapping between the first and second addressing domains at the entry end module proves beneficial when the destination termination device replies to the originating termination device.

Upon receipt of the wrapped packet by exit module 16b, the destination address changes (i.e., is mapped) from exit module 16b to an addressing domain recognizable to destination termination device 14b. In this manner, mapping occurs when entering the network and also occurs when exiting the network. Additionally, mapping is needed to indicate possibly numerous termination devices attached to module 16b. Thus, mapping is used to translate between addressing domains of the entry and exit modules and intermediate modules of $NW_2$ and the addresses of the entry and end modules which then have to forward the data to corresponding termination devices. The source address, however, remains the same as that which was changed when the packet is forwarded into the transmission network. Given that the destination address is termination device 14b, exit module 16b performs the entirety of all mapping needed by the transmission network. Mapping occurs in order to determine which of the possible N number of termination devices 14b is to receive the outgoing packet.

Mapping proceeds by comparing the address within the packet against the appropriate identification number of a possible N number of termination devices $T_1/T_2$. A mapping table or a generalized selection unit may therefore be formed within memory of exit module 16b. Mapping is performed by comparing the destination address within the wrapped packet against the identification number of a termination device selectibly coupled to the exit module 16b. When the comparison yields a match, the packet is forwarded to the appropriate termination device.

Any reply of the initial forwarded address can be sent back across the network based on the format of the wrapped packet. More specifically, the source address of the reply remains the address of termination device 14b; however, the destination address is the previous source address. In this manner, reply information is made similar to the initial forwarded information. Regardless of the initial request or a subsequent response, the packets of data are routed to the opposing end module. In particular, information from termination device 14a is directed to exit module 16b, while reply information from termination device 14b is directed to entry module 16a. A source address is therefore said to change whenever a packet enters the network; however, the destination address remains the same. The same procedure applies on a reply.

As noted by reference numeral 37, the wrapped packet contains source and destination addresses, whereby the source address of an external terminal identification number/address is mapped to an internal module identification number/address residing at an address domain separate and independent from the external identification number/address. Moreover, the destination address of the wrapped packet within the network has an identification number/address unique to the internal identification numbers of the network. Accordingly, the internal addressing domain/protocol is shown with the letter "$D_2$" as a first addressing domain of unique identifier numbers for that network (intermediate modules and end modules) which may share with numbers/addresses outside the network, however, addressing outside the network is separate and distinct from addressing internal to the network by virtue of a mapping function which occurs at the periphery of the different addressing domains (whether an addressing domain can be encompassed in one, two, or more networks). The internal addressing domain $D_2$ and the external addressing domain $D_1$ are consistent with those shown in FIG. 1.

Figure 6:
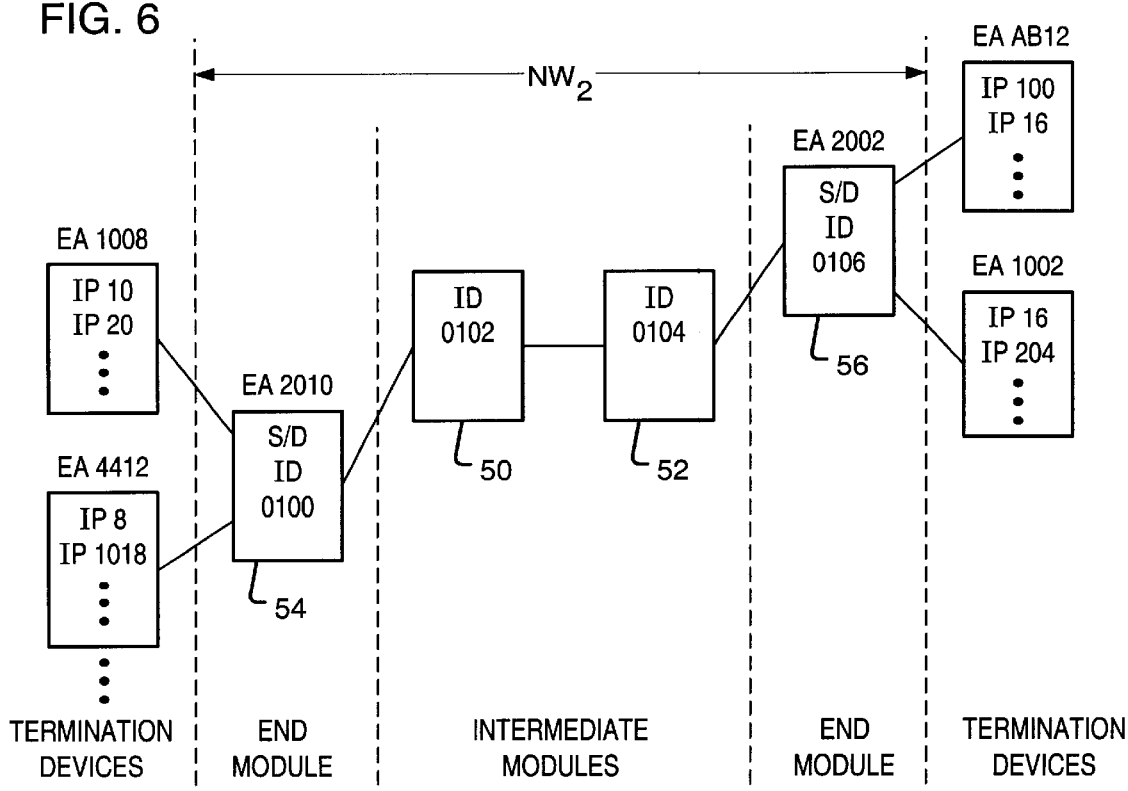
FIG. 6 is a block diagram showing an example by which Ethernet addresses and IP addresses are assigned to modules outside the first addressing domain, with addresses assigned to modules within the network (i.e., end module and intermediate modules), wherein a mapping occurs at the end modules between first and second addressing domains.

FIG. 6 illustrates the transparent conversion and/or mapping of addresses of domain $D_1$ to domain $D_2$ addresses external to the network. Certain numbers are applied to those addresses, to assist in understanding the mapping operation. It is understood, however, that the addressing numbers are merely examples, and in no way limit the scope and breadth of the mapping operation. Termination devices are resident in addressing domain 1 ($D_1$ of FIG. 1). The end modules (such as 54 and 56) reside both in serviced domain 1 and servicing domain 2 ($D_2$ of FIG. 1). End modules are responsible for transparently mapping the addresses of the two domains. Intermediate modules (such as 50 and 52) are resident entirely in $D_2$.

FIG. 6 depicts a scenario as applied to popular IP Networking layer and Ethernet Data Link Layer or Physical layer. It should be noted that the transparent address mapping mechanism applies to other transmission protocols as well. In the example shown, termination devices can be regarded as host devices and, in the domain $D_1$ (Ethernet) addressing, can have numerous clients coupled to that host, each having its own address. The host device can have a domain $D_1$ Ethernet address "EA" unique to that host. Information can be sent to the host or received from the host by clients coupled thereto, each client having its own unique address represented at a higher OSI layer (e.g., an internet protocol address "IP"). Thus, for example, IP 10 can represent the IP address of a termination device which forwards information into the transmission network. Since device at address IP 10 is presented in the Ethernet physical layer, source address IP 10 is wrapped with another source Ethernet address EA 1008. The source IP address and domain $D_1$ source Ethernet address can be noted as "SIP" and "SEA" shown in FIG. 7.

The packet(s) of data sourced from a device having a unique SIP and SEA is typically destined for another device located elsewhere within the intranet or internet. The targeted device may be one by which the data must traverse the transmission network in order to be received on that device. The targeted device is often called the destination device, which has a unique destination address in domain $D_1$. The destination address, when viewed from outside of, or external to, the transmission network, will have a destination IP address ("DIP"). At the physical layer, provided the local network, subnet, or internet uses Ethernet, a destination Ethernet address ("DEA") will also be specified.

While source and destination addresses are typically applied to the wrapped data packet, it is not until the packet is received upon the entry end module will the packet be further wrapped with source and destination addresses unique to the transmission network which constitutes domain $D_2$ of FIG. 1. Only the end modules (entry and exit end modules) will have domain $D_1$ Ethernet addresses. The intermediate modules will not have domain $D_1$ Ethernet addresses unless they are used, or could be used, as end modules in another data flow path. If the intermediate modules never suffice as end modules, then they will not require domain $D_1$ addresses. In the example shown, intermediate module 50 may be used as an end module if input is received from another termination device directly connected to module 50. However, module 52 is never connected as an end module and, therefore, need not require an Ethernet address. The domain $D_2$ identification numbers ("$D_2$IDs") can be arranged in sequence based on their hierarchical level or any other network architecture. $D_2$ID can be used to introduce structure within the transmission network in domain $D_2$, completely transparent to domain $D_1$, which often is a public domain. In the example shown, $D_2$IDs representative of the traffic flow begins with address 100, and increments to $D_2$ID 106. While the Ethernet addresses of end modules and some intermediate modules is random, as shown by EA 2010, EA 4008, and EA 2002, the $D_2$IDs need not be random. The example of FIG. 5 illustrates the use of 16 domain 1 Ethernet bits (4 hex), yet the domain 2 $D_2$IDs can be representative of far more than 16 bits. In the example shown, 16 bits is used, but it is understood that the number of bits can extend far beyond 16, approaching 64 bits or higher. Alternatively, the addressing domain $D_2$ can be much smaller than 16 bits, if needed. Thus, the addressing domain $D_2$, and the field of bits used to represent that addressing domain, can be scaled depending on the size of the network, or whether multiple networks are encompassed within that domain.

In the example by which data flows as packets from IP 10 to IP 100, end module 54 suffices as an entry end module for initial transmission, and end module 56 functions as an exit end module for that transmission. During a subsequent reply, the entry end modules are reversed, whereby end module 56 suffices as an entry end module and end module 54 will suffice as an exit end module. Thus, the end modules function as bookends for data transfer across the network, whereby the entry end module wraps the packet and domain $D_1$ source and destination addresses with domain $D_2$ source and destination addresses. The exit end module strips the domain $D_2$ source and destination addresses, thereby leaving in place mapping to the final target device, represented within the network as an Ethernet device, or outside the domain $D_2$ network as an IP-identified device.

Figure 7:
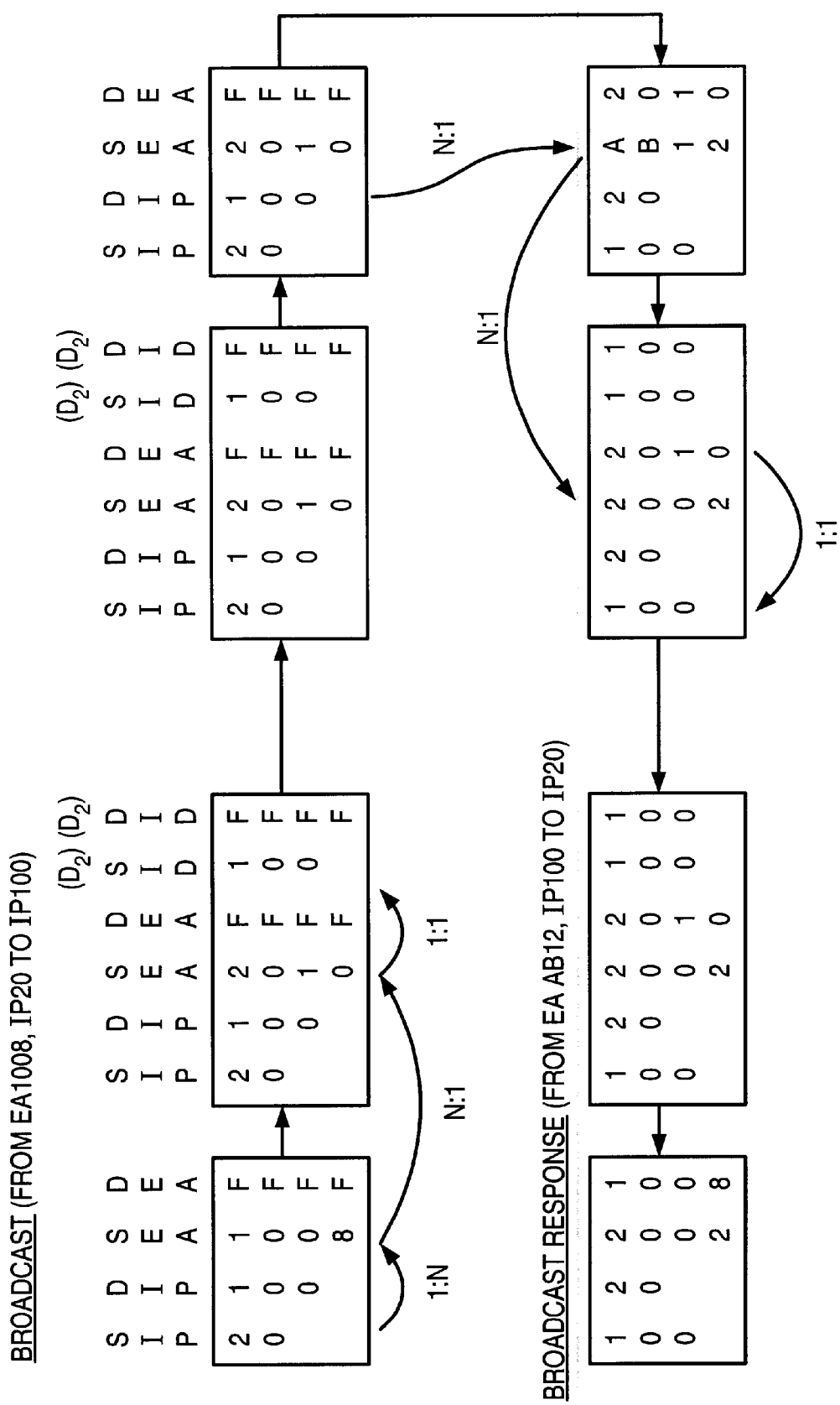
FIG. 7 illustrates a broadcast address resolution procedure using the example of FIG. 6 whereby, from a known destination IP address of a termination device, both a destination Ethernet address for that termination device and a second addressing domain of an end module physically linked to the that termination device are determined (or resolved)

Turning to FIGS. 6 and 7, in conjunction, illustration of an ARP process is shown. The ARP is shown with an example by which the relationship between end modules and modules/devices external to the domain $D_2$ network are resolved. Specifically, the relationship between the source $D_2$ID ("SD$_2$ID") and the devices external to the network coupled to the SD$_2$ID are resolved, along with the relationship between the destination $D_2$ID ("DD$_2$ID") and the devices external to the network. The broadcast operation is better illustrated by the example of which SIP at address 20 forwards a broadcast signal (SEA 1008) to all modules and termination devices within the transmission network as well as devices connected to that network to determine the $D_2$ID of an exit end module coupled to the DIP of 100, not yet knowing the DEA of the device corresponding to the DIP. As such, a broadcast signal of all ones, can be sent across the network from the SIP to the DIP. This entails wrapping the SIP, DIP, SEA, and DEA with the SD$_2$ID and DD$_2$ID. However, the DD$_2$ID is not yet known. The SD$_2$ID will be the $D_2$ID of the entry module (54 in FIG. 5). Entry module also has the SEA value of 2010 of domain $D_1$. Domain $D_1$ SEA (1008 in the example) of incoming packets is mapped to the domain $D_1$ SEA (2010) of the entry module. If there are N termination devices attached to given entry module, this mapping will be a N:1 mapping. Moreover, the SEA-mapped address is translated or mapped on a 1:1 basis to the SD$_2$ID.

The mapped packet of data is then received by the exit end module, whereby the SD$_2$ID and DD$_2$ID are stripped from that wrapped packet. The DEA remains an unknown, hence the packet is sent to all of the termination devices as it is a broadcast packet. When a terminating device responds, when forwarding the broadcast response back to the originating (source) device, the DIP is mapped to the SEA. Similar to when the broadcast ARP is wrapped during the initial transmission, the SEA is mapped to the entry end module of the responding transmission. As shown, the SEA of AB12 (hex) is mapped N:1 to the entry end module at 2002 (hex). Thus, the entry end module of the response (i.e., module 56) can transfer the wrapped packet from source Ethernet address SEA AB12 back to IP 20. As shown, the response packet will have a SIP of 100, DIP 20, SEA of AB12 and DEA of 2010 when entering the module 56. The DD$_2$ID is determined by a using a static 1:1 mapping table of domain $D_1$ DEA to domain $D_2$ $D_2$ID. The packet will be wrapped with SD$_2$ID of 106 and DD$_2$ID of 100. The termination device SEA of AB12 will be replaced with the entry module SEA of 2002.

At the exit end module 54, the internal structured identification numbers (SD$_2$ID and DD$_2$ID) are removed, as shown. Also, the DEA of the exit termination device is determined by using the terminating device DIP as the look-up parameter for 1:N mapping to domain $D_1$ terminating device DEA. The end module domain $D_1$ DEA (2010) is replaced with DEA (1008) of the terminating device corresponding to the DIP of 20. While the relationship between the entry termination device and the entry end module is known by virtue of the packet entering the entry end module and getting wrapped with the entry end module identification number, the ARP operation beneficially discovers the relationship between the exit end module and the targeted, or downstream, device. By broadcasting packets of data with a destination noted as a known broadcast destination, response to that broadcast operation will determine not only the relationship between domain $D_1$ Ethernet address and the IP address of the targeted device, but also the relationship between the targeted device adjacent to the network and the exit end module. Thereafter, normal data transmission can occur to a DEA of the targeted device as well as the DD$_2$ID of the exit end module adjacent that targeted device.

In one embodiment, the mapping of DIP to DEA can be entered at the time in which the network is configured. The mapping is generally configured once (i.e., statically); however, the network can be updated to reflect any changes to the transmission network. In another embodiment, The mapping can be captured every time a packet is passes through the entry module. As can be seen, there can be various embodiment with combinations of these mechanisms.

Thus, by using simple 1:1, N:1, and 1:N mappings, transparent address mapping between multiple domains is achieved for data transmission. All the mapping occurs at the boundary resulting in a simple, transparent address mapping mechanism.

Figure 8:
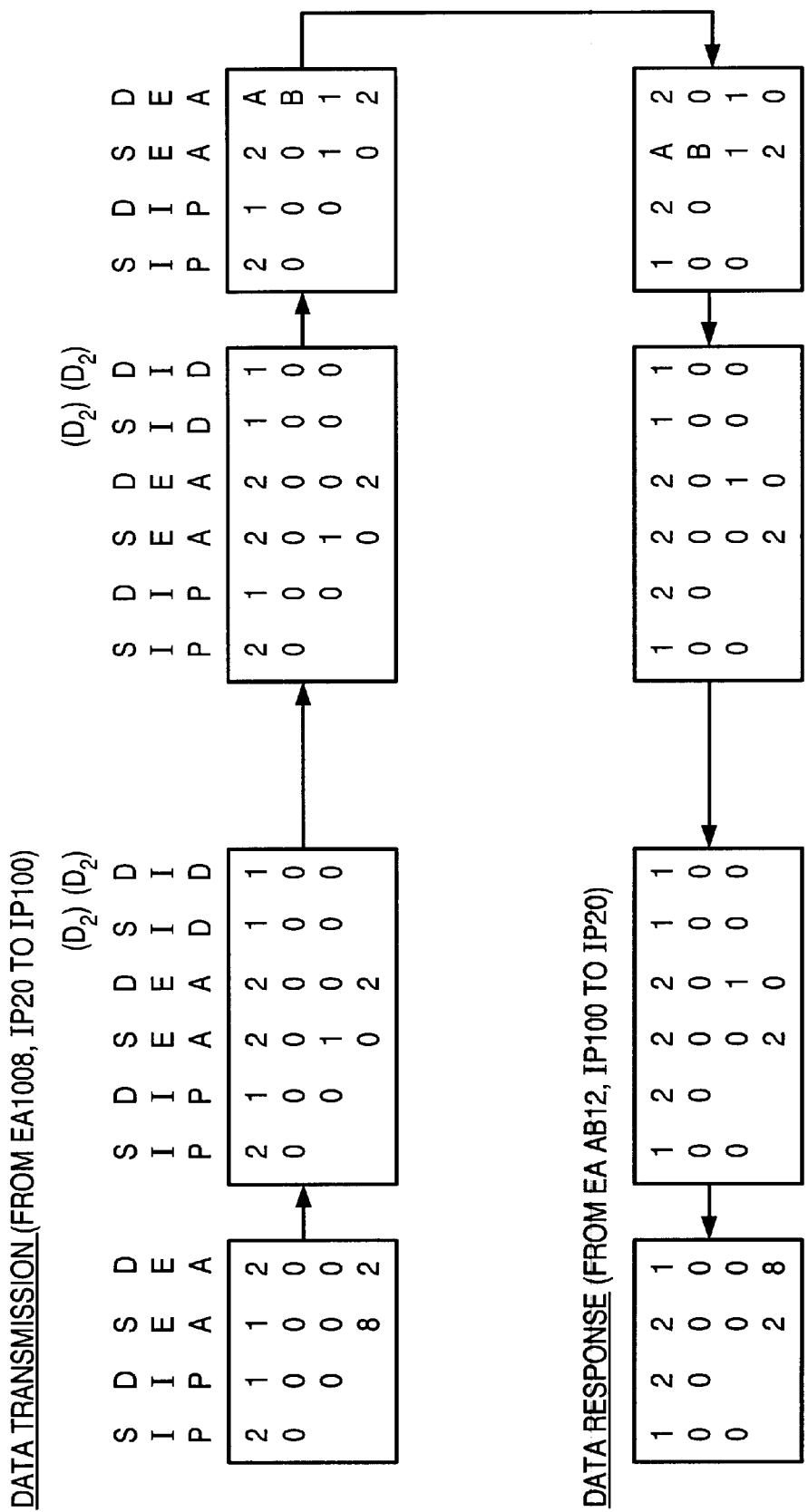
FIG. 8 illustrates a data transfer procedure using the example of FIG. 6, after the second addressing domain of the destination termination device and the first addressing domain of the end module physically linked to that termination device are determined.

FIG. 8 illustrates in further detail a data transmission operation, knowing the DD$_2$ID to be adjacent to the DIP. In other words, data transmission following ARP allows for the entry end module to wrap the packet of data with the SD$_2$ID of that entry end module and, more importantly, the DD$_2$ID of the exit end module. Knowing the entry and exit end modules, beneficially removes any translations needed within the transmission network. This allows the data packet to be forwarded across the transmission network directly from the entry end module to any and all intermediate modules, and finally to the targeted exit end module without performing any table lookups as in conventional router techniques. When data is initially transmitted, the SEA external to the transmission network is translated to the SEA of the entry end module, so that any responses can be directed to that SEA which, by the way, has a corresponding $D_2ID$ that is forwarded as an $SD_2ID$ and targeted on responses as a $DD_2ID$. The same mapping functions of FIG. 7 take place for FIG. 8, with the mapping functions being a relatively small number N. Instead of having to map internal to the transmission network, mapping only takes place based on a limited number of devices N immediately upstream or downstream of an entry or exit end module. By knowing relatively few external modules adjacent the network, mapping can be efficiently performed with little, if any, translations. For example, there may be only one termination device connected to an entry end module, thereby making N equal to one.

Figure 9:
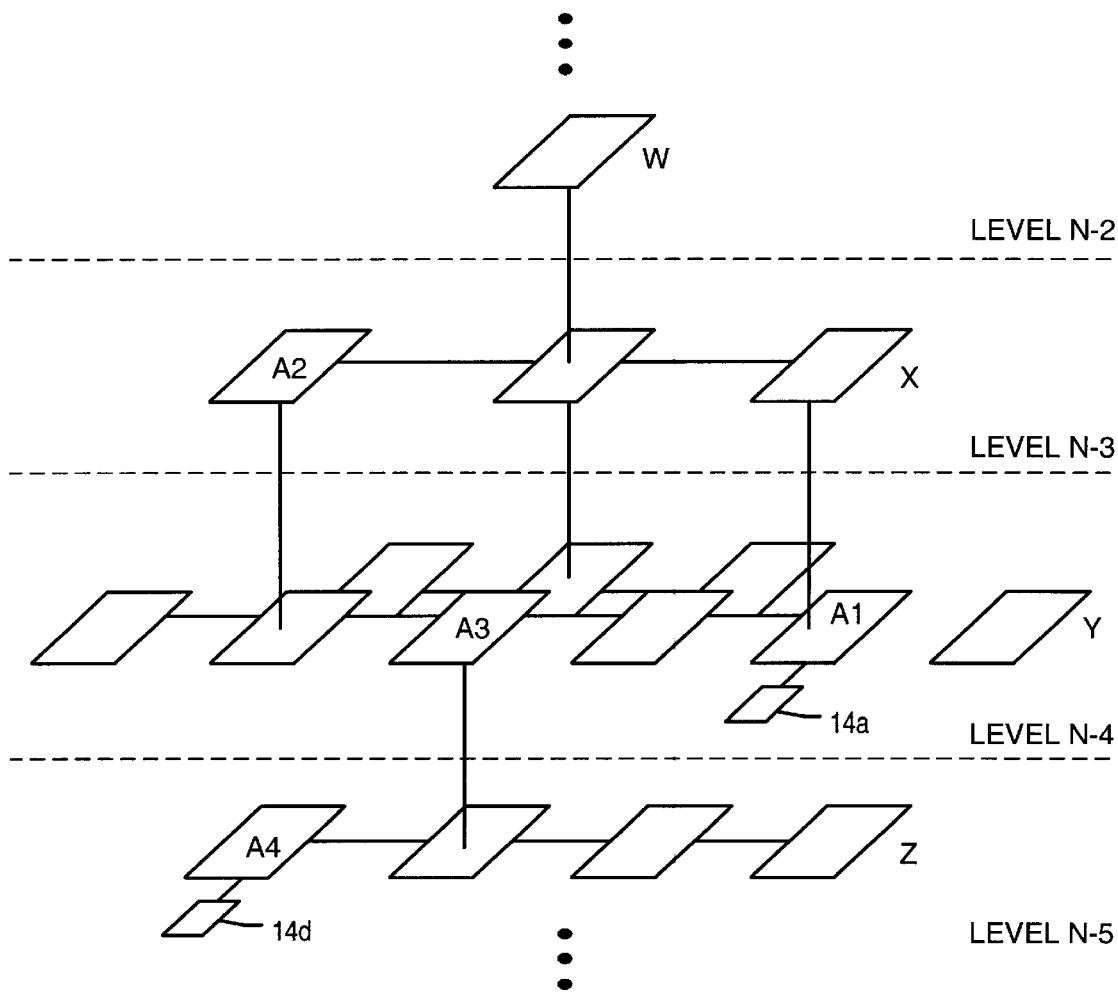
FIG. 9 is a logical diagram of nodes and associated modules arranged within levels of the network, each level indicating a field of bits unique to switches within that level.
Figure 10:
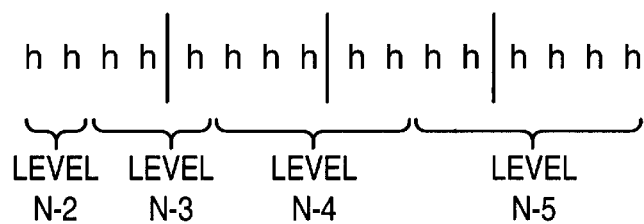
FIG. 10 is a module addressing packet forwarded through the network of FIG. 9 to enable fast decoding of bit groupings (or fields) on a field-by-field basis according to the hierarchical, relative placement of modules within level of the network.

Although not necessary, the network having addressing domain $D_2$ could be structured in its addressing. If the network was a structured (i.e., hierarchical) addressing, then FIGS. 9 and 10 show, in combination, one example of a distributed routing mechanism using structured hierarchical decode mechanisms. The network 10 indicates three levels of possibly numerous levels. Modules 16 are each configured with a unique identification number within a field of bits applicable to that module's level. In particular, the identification number is different within only one field attributed to modules X, and the identification number is different with another field attributed to modules Y. All other fields are don't care fields, or are irrelevant for comparing within that level. In the example shown in FIGS. 9 and 10, communication from a termination device 14a to 14d is forwarded to a series of compare operations. First, the address of a packet sent from termination device 14a, at level N-4, is compared with an identification number and, more specifically, a field of bits in level N-3 and higher. If the comparison does not yield a match, then it is determined that the packet must be forwarded from module A1 in level N-4 to the next higher level. When a compare of fields N-2 and higher yields a match, the match is then checked against all nodes at that level and forwarded to the appropriate module identification number (e.g., module A2) that yielded a match in level N-3. It is known that termination device 14a is coupled to module A1 and, therefore, decode need not take place at level N-4. Secondly, another decode must occur at the next higher level (level N-2) to determine if the address forwarded from termination device 14a is to be routed to a module in level N-2. If the comparison does not yield a match, then it is known that routing need not occur to the next highest level. The routing algorithm performs a comparison of the next lower level. Knowing that the highest level of routing is currently at modules X within level N-3, the next comparison of the packet address is performed on modules in level N-4. If a match results, then that match is identified as a particular module (e.g., module A3). The comparison or decode process continues onto the next lower level, level N-5, to determine if further routing is needed. If the address at the next lower level of fields compares with an identification numbers in the next lower level field (level N-5), then it is determined that the routing must continue to a particular module A4 that yields the comparison. The term "routing" is used in the sense of forwarding data packets across a network, from module-to-module, and should not be construed as involving a router. Instead, the routing herein merely refers to an incremental step in the distributed routing mechanism of the overall network and is used by a module to forward packets among hierarchical levels based on a decode comparison.

As shown in FIGS. 9 and 10, the forwarding or incremental routing algorithm operates solely upon the destination packet address and identification numbers stored in registers of each module. Registers within the input/output port decoders and traffic controllers are called upon by the decoders to perform a comparison with the incoming addresses without need for performing a look-up operation. Importantly, decode need only be performed on one or more number of fields within a plurality of fields—that field corresponding with where the prior comparison occurred within the overall hierarchical structure. Knowledge of the termination device whereabouts relative to the entry and exit end modules is a prerequisite to the present fast decoding algorithm. The mechanism for determining termination devices relative to end modules will be discussed herein below when performing a broadcast operation of the IP addresses across the network to all the various termination devices coupled to that network.

Each module can perform fast decoding. Depending on which level a termination device is connected, decoding occurs at all higher levels, beginning with the next higher level of fields of bits. An entry end module can mark a bit in the control word that level. The intermediate modules can perform the same function when forwarding a packet to the next level—either a higher or lower level that is setting a bit or bits in a control word signifying a match of levels. Decoding occurs in level N-3 for an origination termination device coupled to a module in level N-4. Once a non-compare occurs, then it is known that routing must now proceed, or possibly stop, at the level just below the level that yielded a non-compare. In the example of FIG. 9, comparison stopped when level N-3 yielded a non-compare—indicating that all higher levels greater than level N-3 will not receive the forwarded packet. Beneficially, all higher levels and derivatives from those higher levels which are outside of module A2 shown in FIG. 9, need not undergo a comparison function. Comparisons at each level can be comparisons at all higher levels. Once a higher level compare is true, then the lower level comparisons are performed. Entry end modules or nodes can mark a bit in a control word which signifies the level and the remaining modules or nodes in that level may compare only that level of bits. Intermediate nodes or modules can do the same when forwarding the packet to the next level.

Once the highest level is identified for forwarding the packet, decode now continues down the hierarchical levels in succession. Comparisons for those levels are performed until a lower level module identification number favorably concurs with the destination address. That module is identified as an exit end module that is selectably coupled to the target or destination termination device 14d, shown in FIG. 9.

The successive decode of bits within only a certain field, and progressing field-by-field across the incoming address and identification numbers minimizes the number of comparisons needed and the number of module identification numbers being compared against. This relatively fast decode operation performs distributed routing function within the structured, hierarchical network, with the benefit of performing incremental routing by decode operations only on the field of interest and ignoring all other fields at any given point. The concept of being aware of all module whereabouts within the network is of primary importance when forwarding the packets. This awareness in the network is beneficial not only in a hierarchical network but also in a single level of hierarchy such as local loops. For instance, based on the identification number indicating where the module is located, and the destination address, the packet can be sent around the local loop among the interconnected modules, either right of left.

FIG. 10 illustrates possible use of 64 bits (or possibly more) to represent all possible modules within the network. Since it is more likely than not that the lower level modules could be more prevalent, the lower levels can have more reserved bits. For example, level N-5 could have 6 hex reserved, with levels above level 5 having fewer bits reserved. Of course, the structure by which fields of bits are bifurcated to represent different levels can vary according to the size of the network and the methodology by which the hierarchy is established.

It will be appreciated to those skilled in the art having the benefit of this disclosure that the various embodiments herein are believed to capable of performing fast and efficient transfers across a network which either replaces or forms at least a portion of a conventional communication system. The network may or may not be structured. Regardless of its addressing mechanism or domain, the network advantageously maps to other networks having an addressing domain separate and independent from the network. Various modification and changes may be made as would be obvious to a person skilled in the art having the benefit of this disclosure. The efficient transfers take place, in part, by utilizing a separate set of identification numbers or addresses unique to the network. However, those identification numbers and addresses are transparent to the end-user, and all mapping to those addresses take place at the entry end modules, whereas the added identification numbers and addresses are stripped at the exit end module, with minimal mapping at the network periphery. It is intended that the following claims be interpreted to embrace all such modifications and changes and, accordingly, the specification and drawings are to be regarded in an illustrative rather than a restrictive sense.

What is claimed is:

1. A communication system, comprising:
   a pair of end modules, one of which is an entry end module and the other of which is an exit end module;
   at least one intermediate module coupled between the pair of end modules;
   a first addressing domain for identifying each of the end modules and the intermediate module; and
   a second addressing domain, separate and independent from the first addressing domain, for identifying each of the end modules exclusive of identifying the intermediate module.

2. The communication system as recited in claim 1, wherein said at least one intermediate module comprises a first set of intermediate modules within a first hierarchical level of modules coupled to receive the data before a second set of modules within a second hierarchical level of modules receives the data, and wherein said first addressing domain identifies each of the first and second set of modules with a unique identification number such that each said identification number is bifurcated into a first and second field of bits which identify respective said first and second set of modules.

3. The communication system as recited in claim 2, wherein said first set of intermediate modules and said second set of intermediate modules include first decoders and second decoders, respectively, and wherein the first decoders are coupled to compare an address of said data within said first field of bits, and the second decoders are coupled to compare an address of said data within said second field of bits after the first decoder has compared the address with said first field.

4. The communication system as recited in claim 3, wherein said first decoders compare the address of said data with said first field to determine routing of said data to said second set of intermediate modules.

5. The communication system as recited in claim 1, further comprising:
   a first termination device coupled to the entry end module for sending said data into the communication network; and
   a second termination device coupled to the exit end module for receiving said data from the communication network.

6. The communication system as recited in claim 5, wherein said first and second termination devices comprise a router, a computer, a switch or a gateway, and if said termination device is a router or a gateway then said communication network is an intranet within an internet.

7. The communication system as recited in claim 1, wherein said at least one intermediate module comprises a plurality of intermediate modules interconnected to form at least two subnetworks interposed between the entry end module and the exit end module.

* * * * *